United States Patent

Burns et al.

Patent Number: 5,241,786
Date of Patent: Sep. 7, 1993

[54] IRRIGATION CONTROL SYSTEM

[75] Inventors: Ivey L. Burns; Eldon R. Muller; Edward Bell, all of Orlando, Fla.

[73] Assignee: The Walt Disney Company, Burbank, Calif.

[21] Appl. No.: 677,487

[22] Filed: Mar. 29, 1991

[51] Int. Cl.⁵ .............................. A01G 25/16
[52] U.S. Cl. .............................. 47/79; 47/62
[58] Field of Search ............. 47/62, 79–82, 47/48.5, 18 R, 59, 60

[56] References Cited

U.S. PATENT DOCUMENTS

| | | |
|---|---|---|
| Re. 31,023 | 9/1982 | Hall, III . |
| 984,964 | 2/1911 | Pladeck .............................. 47/18 R |
| 3,293,799 | 12/1966 | Keller et al. . |
| 3,314,192 | 4/1967 | Park .............................. 47/18 R |
| 4,021,964 | 5/1977 | Darwin et al. .............................. 47/62 |
| 4,048,753 | 9/1977 | Roberts, Jr. et al. . |
| 4,059,227 | 11/1977 | Hunter . |
| 4,060,934 | 12/1977 | Skaggs . |
| 4,107,875 | 8/1978 | Bordine .............................. 47/62 |
| 4,209,131 | 6/1980 | Barash et al. . |
| 4,332,105 | 6/1982 | Nir . |
| 4,423,484 | 12/1983 | Hamilton . |
| 4,630,394 | 12/1986 | Shevard .............................. 47/18 R |
| 4,676,023 | 6/1987 | Mori .............................. 47/82 |
| 4,691,290 | 9/1987 | Griffen . |
| 4,760,666 | 8/1988 | Han . |
| 4,796,212 | 1/1989 | Kitagawa . |
| 4,834,579 | 5/1989 | Aris et al. . |
| 4,849,918 | 7/1989 | Feinland . |
| 5,020,275 | 6/1991 | Bednarzik .............................. 47/79 |

Primary Examiner—Carl D. Friedman
Assistant Examiner—Wynn E. Wood
Attorney, Agent, or Firm—Pretty, Schroeder, Brueggemann & Clark

[57] ABSTRACT

An irrigation control system is disclosed for controlling the irrigation of horticultural plants or crops grown in containers The system includes a beam assembly for supporting the plant media system and a load cell for providing an electrical output signal proportional to the load applied to the beam assembly by the plant media system. The load cell is interfaced with a microcomputer which executes a control program of the present invention. The control program reads the signal from the load cell at selected intervals and signals for an irrigation event if the current weight of the plant media system is less than a predetermined base weight. A new predetermined base weight is calculated and reset after each irrigation event. In this way, the system bases the initiation of an irrigation event on real time, short term, differential weight change of the plant media system due to evapotranspiration, while allowing for compensation of weight change effects due to other factors such as fruit set, plant weight, pruning and harvesting.

9 Claims, 2 Drawing Sheets

IRRIGATION CONTROL SYSTEM

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to irrigation control systems and, more particularly, to a system and method of initiating an irrigation event of plants that are grown in containers.

Many horticultural crops are typically grown in containers, such as pots, bags, and rockwool slabs, having growth media, where the roots are confined to a very limited area. The plants or crops and the growth media are generally collectively referred to here as the plant media systems. To ensure adequate irrigation, these plants or crops are often excessively irrigated, resulting in a waste of water and fertilizer contained in the water. Excessive irrigation also results in runoff containing high amounts of nutrients, such as nitrates and phosphates, and soil applied pesticides, all of which are potential sources of pollution to the environment. This is of concern, since laws are now requiring much stricter control of runoff which may contribute to environmental problems.

Many techniques have been utilized in the past to measure moisture in plant media systems to control irrigation, but the hydraulic characteristics of most media make the measurement of moisture content difficult. In situ sensors utilizing principles of electrical conductivity, thermal diffusivity, soil suction, and microwave attenuation have been used to measure moisture content in plant media systems. However, while theoretically sound, these principles are difficult to apply in controlling irrigation systems. Furthermore, while weighing lysimeters have been used to extrapolate weight changes to evapotranspiration, none have been effective in taking into account extraneous weight changes due to drainage, and hysteresis or the varying moisture storage capacity of growing media, and changes in plant weight as a result of fruit set, vegetative growth, pruning, and harvesting. It is essential to take these factors into account to accurately determine weight change due to evapotranspiration.

Accordingly, there has existed a definite need for an irrigation control system for overcoming these problems and for precisely controlling irrigation based on measured evapotranspiration. There further has existed a need for an irrigation control system which allows for compensation for weight changes due to factors such as fruit set, vegetative growth, pruning and harvesting. The present invention satisfies these needs and provides further related advantages.

SUMMARY OF THE INVENTION

The present invention provides an irrigation control system for controlling the irrigation of container grown horticultural crops and the like. The irrigation control system comprises a movable beam assembly for supporting a plant media system and a load sensing means for providing electrical output signals proportional to the load applied to the beam assembly. These signals are then fed to control means for controlling and signalling for an irrigation event for the plant media system. The control system is thus designed to control the irrigation of the plant media system based on the real time, short-term, weight differential of the plant media system between irrigation events.

In accordance with the invention, the control program receives signals from the load sensing means at selected intervals, for example, every ten minutes. If the weight of the plant media system sensed by the load sensing means falls below a predetermined base weight, then the control program will cause the initiation of an irrigation event to occur and the plant media system will be irrigated. After each irrigation event, the control program will recalculate and set a new base weight that is equal to the weight of the plant media system after the irrigation event less a preselected weight value. This preselected weight value may be based on the amount of water added to the plant media system by each irrigation event, or it may comprise an acceptable amount of water loss before a new irrigation event is required.

Thus, the irrigation control system of the present invention relies on the real time, short term, differential weight measurements of the plant media system to determine when an irrigation event is necessary. This real time, short term weight monitoring allows for the control of irrigation on the basis of the evapotranspiration of moisture from the plant and plant media system, while compensating for weight changes as a result of fruit set, vegetative growth, pruning, harvesting, drainage and hysteresis. Consequently, excessive irrigation and fertilization is avoided, as well as excess runoff containing environmentally undesirable pollutants such as nitrates, phosphates, and soil applied pesticides.

In one aspect of the invention, the control program also has safety or back-up features to provide for the initiation of an irrigation event if the weight of the plant media system falls below a predetermined critical weight limit, or if the computer operations are disrupted causing the stored base weight to be erased or wiped out of the computer's memory, or if the stored base weight is outside reasonable ranges or below a predetermined value (for example, less than zero or some other value as in the case if the computer is disconnected or otherwise loses contact with the load cell.)

In other aspects of the invention, the beam assembly which supports the plant media system comprises an upper beam having one end hinged to a lower beam. The top surface of the upper beam supports the plant media system, such as a rockwool slab having containers for the plants or crops and the necessary growth media, such as soil. In operation, the pivotable upper beam is positioned horizontally over and slightly spaced from the lower beam, which is stationary. Changes in the weight of the plant media system are sensed by the load sensing means, which is preferably positioned on the top surface of the lower beam, in a position to support the upper beam substantially at its centroid.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
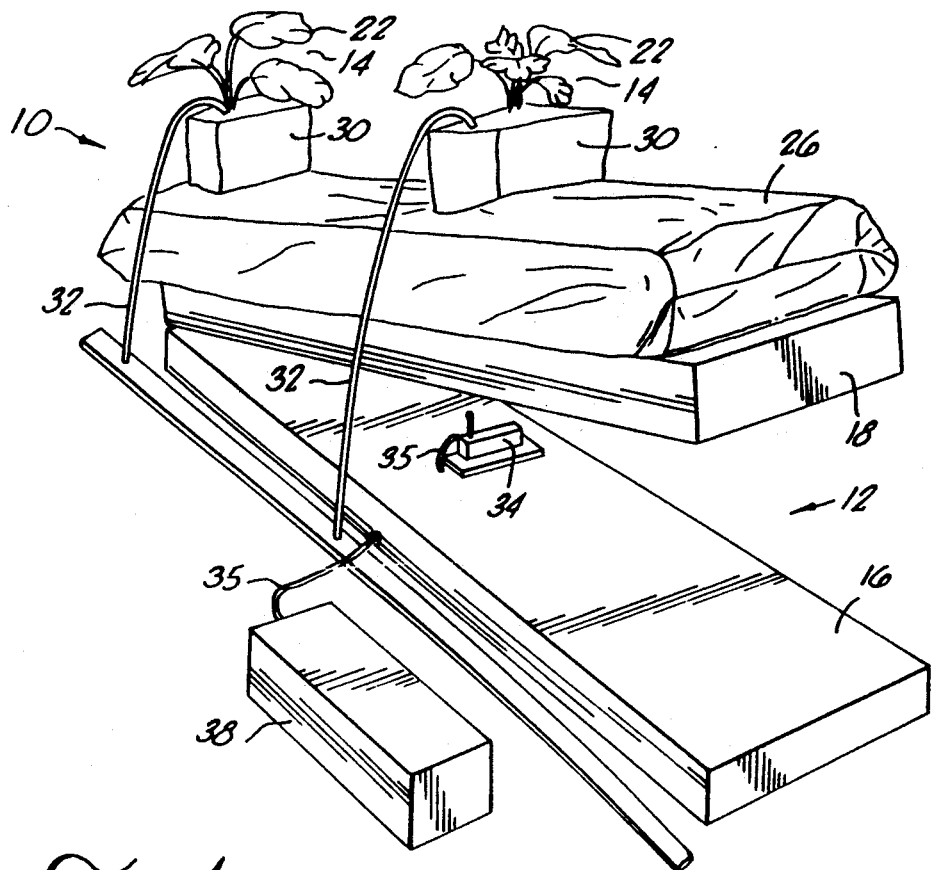
FIG. 1 is a perspective view of an irrigation control system embodying the novel features of the present invention, showing the plant media system supported on a beam assembly and a load cell interfaced with a microcomputer that executes a control program in accordance with the invention.
Figure 2:
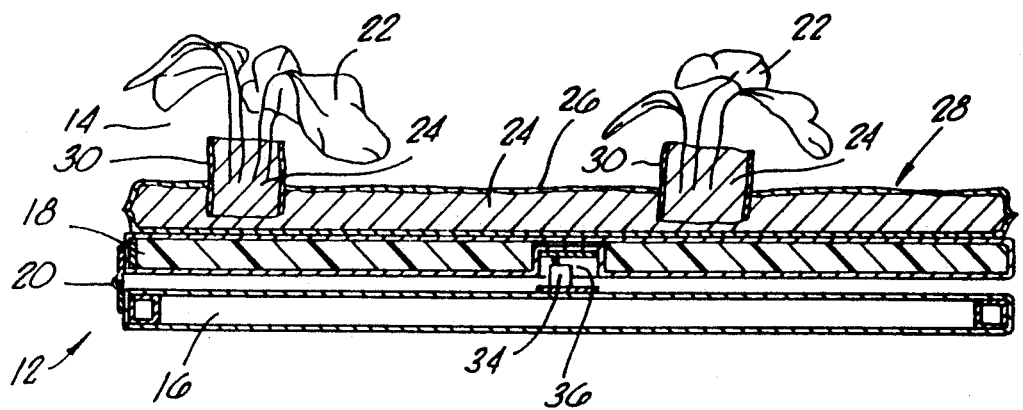
FIG. 2 is a cross-sectional, elevational view of the irrigation control system.

As shown in the exemplary drawings, the present invention is embodied in an irrigation control system, generally referred to by the reference numeral 10, for use in controlling the irrigation of horticultural crops and plants which are grown in containers With reference to FIGS. 1-2 in particular, the irrigation control system 10 comprises a beam assembly 12 for supporting a plant media system 14. The beam assembly 12 includes a stationary lower beam 16 and a movable upper beam which are connected together at one end by a hinge 20. In this way, the upper beam 18 is permitted to pivot with respect to the lower beam 16. The upper and lower beams preferably are constructed in a box-like manner from rigid, water and corrosion resistant materials, such as plastic, fiber-glass or other suitable materials.

A plant media system 14 is supported on the top surface of the upper beam. The plant media system 14 includes, for example, greenhouse or nursery type plants 22 grown in soil or other growth media 24. In the preferred embodiment, the growth media 24 is contained in a so-called rockwool slab 26, having a plastic bag-like shell 28 for holding the growth media. The plants 22 preferably have their own individual containers 30 nested in the top of the rockwool slab 26 to allow water to be directed at the growth media around their roots. The containers 30 can be constructed of and contain the same material as the rockwool slabs. The plants 22 are irrigated through irrigation lines 32 It will be appreciated that other types and forms of plant media systems can be used, depending on the particular requirements involved.

The weight of the upper beam 18, and the plant media system 14 it carries, is continuously monitored by a load sensing means 34 in the form of a load cell or other load sensing device positioned on the top surface of the lower beam 16. In the preferred embodiment, the load cell 34 is a standard transducer device which provides an electrical output signal representative of the load or weight applied to it by the upper beam 18 and plant media system 22. The preferred location of the load cell 34 is substantially at the centroid of the upper beam 18, since the uniformly distributed load on the upper beam can be sensed as the concentrated force acting at the centroid of the beam. The typical deflection of the load cell 34 is approximately 0.002 inches. When the upper beam 18 is pivoted down to the normal operating position on top of the load cell 34, as shown in FIG. 2, the load cell is received within a recess 36 in the bottom surface of the upper beam. This arrangement allows the upper beam 18 to assume a substantially horizontal position with respect to the lower beam 16 It also allows the space between the upper beam 18 and the lower beam 16 to be minimized, thus preventing debris from collecting on the top surface of the lower beam. The horizontal position of the upper beam 18 also ensures proper distribution of water in the rock-wool slab 26 and a relatively uniform and consistent moisture content in the growth media.

Presently, a model no. SSB-100 load cell manufactured by Interface, Inc. has been found suitable for use with the irrigation control system 10 of the present invention. This load cell 34 is capable of measuring loads or mass in increments of grams with good accuracy. However, it should be appreciated that other suitable load cells 34 and load sensing devices, capable of providing an output signal in proportion to an applied weight or load, may be used in the present system.

The foregoing arrangement of the beam assembly 12 advantageously provides a stable weighing platform which allows the upper beam 18 to pivot in a generally downward or upward direction upon an increase or decrease, respectively, of weight from the plant media system 14 supported upon the upper beam. The hinge 20 provides stability and prevents excessive off axis rotation of the upper beam 18. This particular arrangement of a hinged beam assembly with a load cell at the centroid of the upper beam 18 provides an accurate weighing platform and also greatly reduces costs and maintenance over multiple load cell type structures typically used in weighing devices.

As noted above, the load cell 34 will provide an electrical output signal proportional to the load or weight applied to the beam assembly 12 by the plant media system 14. The electrical output signal of the load cell 34 is sent by load cell line 35 to a microcomputer 38 which reads and processes the signal in accordance with an irrigation control program 40 Specifically, the microcomputer 38 converts the output signal from the load cell 34 into digitized data which is capable of being read and interpreted by the control program 40. A Campbell CR7 data-logger microcomputer from Campbell Scientific, Inc. has been found to be adaptable for use in the preferred embodiment of the present invention. However, it should be appreciated that other microcomputers capable of executing various program languages, such as Fortran and Basic, can be adapted for use with the invention.

Figure 3:
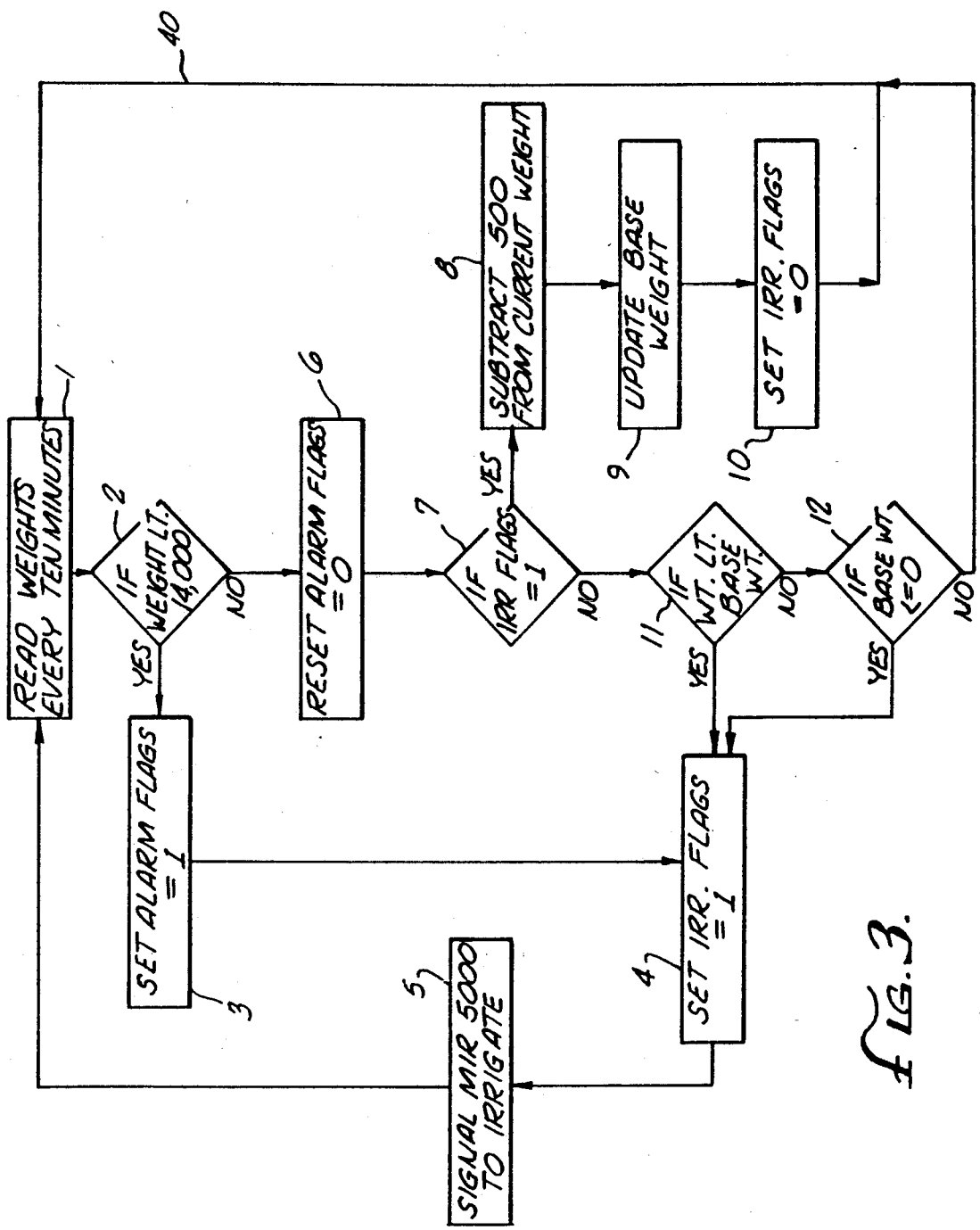
FIG. 3 is a flow diagram illustrating the logic and operation of the control program used to control irrigation events in the system.

FIG. 3 illustrates in detail the flow diagram of the control program 40 used in the irrigation control system 10 of the present invention. As shown in FIG. 3, the output signal from the load cell 34, which has been digitized by the microcomputer 38, is read by the control program 40 to determine the weight applied to the beam assembly 12 by the plant media system 14. Thus, the current weight of the plant media system 14 can be read by the control program 40 continuously or at specified intervals of time, such as every ten minutes, as stated in Box 1.

The weight sensed by the load cell and sent to the control algorithm is actually the weight of the upper beam 18 and the plant media system 14. Since the control program 40 relies on differential weight change, and since the weight of the upper beam 18 remains constant, it is not necessary to calculate the actual weight of the plant media system 14 itself Thus, for ease of reference, the total weight of the plant media system 14 and upper beam 18 sensed by the load cell 34 is referred to as simply the weight of the plant media system 14. However, the weight of the plant media system 14 can be calculated by subtracting the weight of the upper beam 18 from the value of weight sensed by the load cell 34.

After the weight of the plant media system 14 has been read, the control program 40 determines if the weight of the plant media system is less than a particular critical weight limit This particular critical weight limit can be selected as desired, for example, at 14,000 grams or milliliters as shown in Box 2. (One gram of water is synonymous with one milliliter of water since the density of water is 1 gram/ml.) The critical weight limit generally represents the minimum weight capacity, including the moisture content, of the particular plant media system 14 which is being irrigated. A weight reading below the critical weight limit generally signifies that the moisture content of the plant media system 14 is below critical limits and that the plants 22 or crops in the system are in danger of wilting or dying. It is important to note, however, that the 14,000 gram weight unit represented in Box 2 is provided by way of example and illustration only. The particular critical weight limit will vary depending on the plant media system 14 involved and can be readily calculated by one familiar with plant media systems, by taking into account such factors as the type of plant or crop, its size, its moisture or water requirement, and the containers and growth-media used Once the critical weight value is selected, however, it generally remains unchanged absent operator intervention.

If the weight of the plant media system 14 is below the critical weight limit, then the control program 40 will set an alarm flag to a value of one, indicating that a critical condition exists, as shown in Box 3. The control program 40 will then set irrigation flags to a value of one (Box 4), which in turn causes a signal to be sent to initiate an irrigation event (Box 5). The irrigation event referred to herein consists of initiation of the flow of water and/or nutrients via automated valves to the plant media system 14. The amount of irrigation is monitored by using a flow meter or equivalent device. The irrigation event is terminated once a preselected quantity of solution sufficient to return the quantity of solution depleted from the plant media system 14, plus an additional quantity to account for media leaching or other factors, is dispensed In the preferred embodiment, a model no. MIR 5000 irrigation control computer manufactured by Motorola, Inc. has been found to be acceptable for performance of irrigation events. However, it should be understood that other suitable irrigation control computers or devices can be used.

After the irrigation event has been completed, the control program 40 will continue to read the signal from the load cell 34 every ten minutes to determine the weight of the plant media system 14 (Box 1), and whether it is above or below the critical weight limit (Box 2).

If the weight of the plant media system 14 is not less than the critical weight limit, the control program 40 sets an alarm flag to the value of zero, as shown in Box 6. An alarm flag value of zero indicates that a critical condition does not exist, and if it did exist, that it has been corrected.

With reference to Box 7, the control program 40 then determines whether an irrigation ("irr") flag value is equal to one. An irrigation flag value equal to one signifies that an irrigation event has been initiated, as described above, and that a new base weight must be determined. If the current weight of the plant media system 14 ever falls below the base weight, an irrigation event will be initiated, as also discussed below.

The base weight is determined in Box 8 by taking the current weight of the plant media system 14 following an irrigation event, as sensed by the load cell 34, and subtracting from it a predetermined weight. This predetermined weight can be based on the amount of irrigation typically applied, or an amount based on an acceptable water loss before a new irrigation event is required. A predetermined lapse of time may occur before a new base weight is determined after an irrigation event to allow for drainage or leaching of excess water or solution added during the irrigation event. The updated base weight is then stored in the computer's memory, as shown in Box 9. The predetermined amount of weight subtracted from the current weight generally represents the maximum acceptable amount of moisture or water loss from the storage capacity of the plant media system 14 before it is desired or necessary to irrigate. Thus, it should be understood that the 500 gram weight unit amount stated in Box 8 is provided by way of example and illustration only.

By way of further example, if the storage capacity of a plant media system 14 is 10,000 grams of water, and a 5% water loss is the maximum acceptable water loss before an irrigation event is required, then the predetermined weight amount subtracted from the current weight would be 500 grams. Accordingly, those of skill in the art will appreciate that the invention is adaptable to various plant media systems having different irrigation requirements, and that the predetermined amount subtracted from the current weight to update the base weight will depend on factors such as the type of plant, the storage capacity of the container and growth media used, and the amount of moisture required for the specific plant.

In Box 10, the irrigation flag value is set to zero to indicate that the base weight has been updated since the last irrigation event. The control program then continues to read the current weight of the plant media system 14, as represented by Box 1.

With reference again to Box 7, if the irrigation flag value is not equal to one, as is the case when the base weight has been updated, as described above, then the control program 40 will determine whether the current weight of the plant media system 14 is less than the base weight, as illustrated in Box 11. If the current weight is less than the base weight, then the control program 40 sets the irrigation flag value equal to one (Box 4) and sends a signal to the irrigation system to initiate an irrigation event (Box 5). This is the same type of irrigation event described above when the current weight is below the critical weight limit of Box 2.

As mentioned above, the irrigation flag value will be set equal to one, in connection with the initiation of the irrigation event resulting from Box 11. This will cause the control program 40 to update a new base weight again, as described above in connection with Boxes 8-10.

If the current weight is not less than the base weight, however, as determined at Box 11, then the control program 40 will determine whether the base weight is equal to, or less-than, a value of zero (or another predetermined value as discussed below), as represented in Box 12. If the value is equal to or less than zero, or another predetermined value, the irrigation flag value is set to one and a signal is sent to initiate an irrigation event in the manner stated above with respect to Boxes 4–5. This step of the control program in Box 12 is essentially a safety or back-up feature in the event that the operation of the computer 38 is disrupted or the memory is erased or wiped out causing the base weight to be set to a value equal to or less than zero. It is important to note that in some computer systems the base weight value may be set to some other value if the computer malfunctions or is disrupted in its operation. In the Campbell CR7 computer, the value in Box 12 is set to less than or equal to zero if the memory is wiped out or if the computer operations are disrupted. Thus, depending on the computer used to run the control program 40, a different value in Box 12 may have to be used. Further, it should be appreciated that the control program 40 can be utilized to accomplish the objectives of the invention without providing for the back-up system of Box 12.

The control program 40 also has a further back-up feature as referred to above with respect to Box 2. If the current weight of the plant media system 14 is less than the critical weight limit, discussed above, the control program 40 will set the alarm flag (Box 3) and the irrigation flag values (Box 4) equal to one and then signal the initiation of an irrigation event. This process will continue until the current weight is not less than the critical weight limit, in which case the alarm flag will be set to zero (Box 6) and the base weight updated (Boxes 8-9).

In operation, the irrigation control system 10 of the present invention will typically operate on a cycle through the control program 40 in which the current weight of the plant media system 14 will generally be greater than the critical weight limit of Box 2. Under these circumstances, when the irrigation flags are not set equal to one (Box 7), then the control program 40 will continuously be determining whether the current weight, as sensed by the load cell 34, is less than the base weight (Box 11). This determination will be made every ten minutes (or can be made continuously or after another preselected time interval), and when the current weight eventually drops below the base weight, an irrigation event will be initiated (Boxes 4–5). After the initiation of an irrigation event, a new base weight will be calculated (Boxes 8-10), and the cycle will begin once again.

By including a provision to update the base weight after each irrigation event, and by reading the weight of the plant media system 14 on a periodic basis, such as every ten minutes, the irrigation control system 10 of the present invention utilizes the advantages of real time, short term, differential weight measurements of the plant media system to determine when an irrigation event is necessary. This real time, short term weight monitoring allows for the control of irrigation on the basis of the evapotranspiration of moisture from the plant media system 14, while compensating for extraneous (non evapotranspiration) weight changes as a result of fruit set, vegetative growth, pruning, harvesting, drainage, and hysteresis. Consequently, excessive irrigation and fertilization of the plant media system 14 is avoided. Additionally, excess run off of irrigation and fertilizer containing pollutants potentially harmful to the environment, such as nitrates, phosphates, and soil applied pesticides, is minimized.

For example, a drastic and rapid decrease in the weight of a plant media system 14 as a result of pruning and harvesting would signal the initiation of an irrigation event in the irrigation control system of the present invention due to the reliance on short term, real time, differential measurement of weight of the plant media system 14. In this situation, the irrigation control system will set a new base weight and thus compensate for the reduction in weight of the plant media system 14.

By way of further example of the advantages provided by the present invention, it is generally known that about 99% of the water processed by a plant is used for transpiration, while the remaining 1% is utilized for metabolic processes. It is often difficult or impossible using current weighing or gravimetric analysis to differentiate the amount of water used during the metabolic process from the transpiration process. Consequently, when measurements of weight change are made, error in determining the amount of water lost from the growth media is inherent because a small amount of the water removed from the growth media is not "seen" as a weight reduction since it is incorporated into the plant tissue. For instance, a plant that shows a daily weight reduction of 3000 grams in actuality loses some 3030 grams of available water from the growth media since 30 grams is taken up by the plant tissue. Thus, if the plant is irrigated to replace the apparent 3000 grams lost from the growth media, the plant would actually be under-irrigated by 30 grams a day. Thus, without some correction of the cumulative effect of this under-irrigation and weight gain of the plant, a deficit of 3000 grams of available water from the growth media would occur after a period of 100 days. This condition could result in the death or wilting of plants which do not have large growth media storage capacities.

The present invention provides a solution to this situation by resetting the base weight after each irrigation event to compensate for the weight change of the plant media system. This continual process prevents the accumulation of error. That is, since differential weights are used, the absolute weight of the system, excluding critical conditions, is irrelevant. Further, container crops and plants are frequently over irrigated (by as much as 20 to 30%) to provide leaching action which prevents fertilizer salts build-up. Thus, the irrigation control system of the present invention contemplates waiting a short period of time for drainage or leaching to substantially be completed before setting a new base weight after an irrigation event. This avoids the accumulation of error in the system due to the excess water added for leaching The amount of time allowed to lapse after an irrigation event before setting a new base weight can be predetermined on the basis of the time needed to drain or leach the excess quantity of water or solution added to the plant media system.

The irrigation control system of the present invention also compensates for weight changes due to hysteresis or the varying volumetric capacity of the growth media. For example, as the roots of the plants and crops grow, they occupy an increasing percentage of the volume of the container holding the plants and growth media. Also, other factors such as compaction and decomposition of the growth media will affect the volumetric capacity. However, by setting a new base weight after each irrigation event, and by relying on short term, real time, differential measurement of the weight of the plant media system 14 to control irrigation, the resulting effect of hysteresis on the overall weight of the plant media will be accounted for.

An irrigation control system program written for the Campbell CR7 data-logger microcomputer to implement the control program 40 of the present invention in connection with a Motorola MIR 5000 irrigation control computer is set forth as APPENDIX A hereto.

APPENDIX A

```
MODE 02:00
SCAN RATE +60.000
01:P23
 01:02

02:P06
 01:01
 02:03
 03:06
 04:14
 05:01
 06:01
 07:01
 08:5000
 09:0250
 10:+1.0000
 11:+0.0000

03:P86
 01:01

04:P92
 01:0000
 02:0010
 03:10

05:P77
 01:0111

06:P78
 01:01

07:P70
 01:10
 02:0367

08:P30
 01:+1.0000
 02:0600

09:P30
 01:+1.0000
 02:0600

10:P30
 01:+1.0000
 02:0600

11:P30
 01:+1.0000
 02:0600

12:P30
 01:+1.0000
 02:0600

13:P30
 01:+0.0000
 02:0366

14:P92
 01:0000
 02:0010
 03:30

15:P87
 01:00
 02:0010

16:P32
 01:0366

17:P89
 01:0387--
 02:02
 03:+0.0000
 04:10

18:P77
 01:0111

19:P70
 01:01
 02:0366

20:P70
 01:01
 02:0387--

21:P70
 01:01
 02:0367--

22:P77
 01:0010

23:P30
 01:+1.0000
 02:0600

24:P89
 01:0403--
 02:02
 03:+0.0000
 04:10

25:P77
 01:0111

26:P70
 01:01
 02:0366

27:P70
 01:01
 02:0403--

28:P70
 01:01
 02:0367--

29:P77
 01:0010

30:P30
 01:+1.0000
 02:0600

31:P95

32:P78
 01:00

33:P95

34:P92
 01:0000
 02:0002
 03:30

35:P87
 01:00
 02:0010

36:P30
 01:+0.0000
 02:0419--
```

```
37:P95

38:P29
01:01
02:02
03:00
04:04
05:0419

39:P95

40:P92
01:0000
02:0010
03:30

41:P30
01:+0.0000
02:0414

42:P87
01:00
02:0010

43:P30
01:+0.0000
02:0403--

44:P89
01:0387--
02:02
03:+0.0000
04:30

45:P34
01:0367--
02:-500.00
03:0377--

46:P30
01:+0.0000
02:0387--

47:P95

48:P89
01:0377--
02:01
03:+0.0000
04:30

49:P30
01:+1.0000
02:0403--

50:P95

51:P89
01:0377--
02:04
03:+0.0000
04:30

52:P30
01:+1.0000
02:0403--

53:P95

54:P88
01:0367--
02:04
03:0377--
04:30

55:P30
01:+1.0000
02:0387--

56:P95

57:P89
01:0367--
02:04
03:+14000.
04:30

58:P30
01:+1.0000
02:0403--

59:P95

60:P89
01:0403--
02:02
03:+0.0000
04:30

61:P30
01:+1.0000
02:0414

62:P30
01:+1.0000
02:0387--

63:P95

64:P95

65:P89
01:0414
02:02
03:+1.0000
04:30

66:P30
01:+1.0000
02:0413

67:P94

68:P30
01:+0.0000
02:0413

69:P95

70:P89
01:0415
02:02
03:+0.0000
04:30

71:P30
01:+0.0000
02:0415

72:P94

73:P30
01:+1.0000
02:0415

74:P95

75:P29
01:02
02:02
```

```
03:00
04:04
05:0387

76:P95

MODE 03:00
01:P85
01:01

02:P06
01:10
02:02
03:06
04:01
05:04
06:01
07:10
08:1667
09:0367
10:+1.0000

11:+0.0000

03:P53
01:0367
02:+15895.
03:+0.0000
04:+15440.
05:+0.0000
06:+15204.
07:+0.0000
08:+14807.
09:+0.0000

04:P53
01:0371
02:+15402.
03:+0.0000
04:+14706.
05:+0.0000
06:+15270.
07:+0.0000
08:+15207.
09:+0.0000

05:P53
01:0375
02:+15379.
03:+0.0000
04:+15759.
05:+0.0000
06:+1.0000
07:+0.0000
08:+1.0000
09:+0.0000

06:P95

07:P00

MODE 04:00

MODE 10
01:0600
02:2000
```

While a particular form of the invention has been illustrated and described, it will be appreciated that various modifications can be made without departing from the spirit and scope of the invention. Therefore, it is not intended that the invention be limited, except as by the appended claims.

We claim:

1. An irrigation control system, comprising:
   (a) a movable beam assembly adapted to support a plant media system;
   (b) load sensing means for sensing the weight of the plant media system, and for providing signals corresponding to that weight; and
   (c) control means for controlling irrigation of the plant media system in response to the signals received from the load sensing means, the control means being adapted to read the signals from the load sensing means and to signal an irrigation event when the signals indicate that the weight of the plant media system has dropped below a predetermined base weight, the control means further being adapted to calculate and set a new predetermined base weight after each irrigation event by subtracting a predetermined weight from the actual sensed weight of the plant media system after an irrigation event.

2. The irrigation control system of claim 1, wherein the control means is adapted to read the signals from the load sensing means at selected intervals.

3. The irrigation control system of claim 1, wherein the control means is further adapted to signal an irrigation event when the weight of the plant media system sensed by the load sensing means drops below a predetermined critical weight.

4. The irrigation control system of claim 1, wherein the control means is further adapted to signal an irrigation event when the predetermined base weight is less than a predetermined value.

5. The irrigation control system of claim 1, wherein the control means is further adapted to signal an irrigation event when the predetermined base weight is less than or equal to zero.

6. The irrigation control system of claim 1, wherein the beam assembly comprises a rigid beam having a hinged end and a free end, the hinged end being mounted to a fixed structure for enabling pivoting movement at the free end.

7. The irrigation control system of claim 1, wherein the load sensing means comprising a load cell.

8. The irrigation control system of claim 1, wherein the beam assembly comprises of a movable upper beam horizontally disposed over and spaced apart from a stationary lower beam, and wherein one end of the upper beam is hinged to the lower beam to enable pivoting movement of the upper beam with respect to the lower beam.

9. The irrigation control system of claim 8, wherein the load sensing means comprises a load cell positioned on the upper surface of the lower beam such that the load cell supports and senses the weight of the upper beam and plant media system substantially at the centroid of the upper beam.

* * * * *